United States Patent Office 3,170,918
Patented Feb. 23, 1965

3,170,918
3-HALO-16β-CARBAMYL-Δ⁵-PREGNEN-20-ONES
Pierre Crabbé, Mexico City, Mexico, assignor to Syntex S.A., Mexico City, Mexico, a corporation of Mexico
No Drawing. Filed Apr. 13, 1962, Ser. No. 187,202
20 Claims. (Cl. 260—239.5)

The present invention relates to novel cyclopentanophenanthrene compounds and to a process for the production thereof.

More particularly the present invention relates to novel 3-halo-16β-carbamyl-Δ⁵-17α-pregnen-20-one and 3-halo-16β-carbamyl-Δ⁵-17β-pregnen-20-one derivatives.

The novel compounds of the present invention which are progestational type agents with a high anti-ovulatory activity and which are also anti-estrogenic and anti-androgenic agents, are represented by the following formulas:

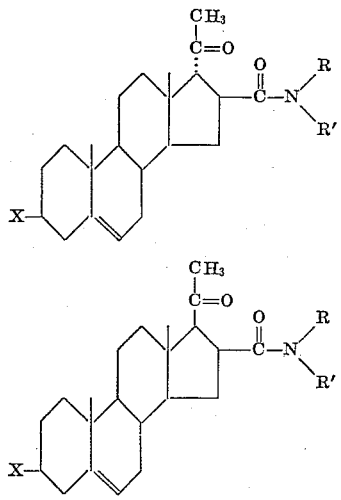

In the above formulas X represents fluorine, chlorine or bromine; R and R¹ each represent hydrogen, a lower alkyl, amino lower alkyl, lower alkyl amino lower alkyl, di-(lower alkyl)amino lower alkyl, aryl or aralkyl groups containing up to 8 carbon atoms; R and R¹ together with the nitrogen represents a heterocycle such as pyrrolidine, piperidine, morpholine or piperazine, which may or may not contain alkyl substituents.

The novel compounds of the present invention are prepared by the process illustrated by the following equations:

In the foregoing formulas X, R and R¹ have the same meaning as set forth hereinbefore.

In practicing the process outlined above, the starting 16β-carbomethoxy-Δ⁵-17α-pregnen-3β-ol-20-one (I) [prepared in accordance with Romo, Tetrahedron, 3, 37 (1958); the correct configuration was assigned by Mazur et al. Tetrahedron 7, 130 (1959)] is treated with tosyl chloride in pyridine, to produce the corresponding 3-tosylate, which upon treatment with a mild base, such as potassium acetate in a suitable polar solvent, such as acetone-water, yields 16β - carbomethoxy - 3,5-cyclo-17α-pregnen-6β-ol-20-one. The latter compound, upon treatment with hydrogen fluoride in a suitable solvent such as methylene chloride, furnishes 3β-fluoro-16β-carbomethoxy-Δ⁵-17α-pregnen-20-one (II: X=F).

Upon reaction of the starting compound (I) with a suitable chlorinating agent, such as phosphorus pentachloride, or a suitable brominating agent such as phosphorus pentabromide, there is obtained 3β-chloro-16β-carbomethoxy-Δ⁵-17α-pregnen-20-one (II: X=Cl) or 3β-bromo - 16β-carbomethoxy - Δ⁵-17α-pregnen-20-one (II: X=Br).

The treatment of the 3β-halo-16β-carbomethoxy-Δ⁵-17α-pregnen-20-one derivatives (II) with ammonia or a primary or secondary amine, such as a lower alkyl amine, di-(lower alkyl)amine, amino lower alkyl amine, aryl amine, aralkyl amine or a cyclic amine such as piperidine or pyrrolidine, in a suitable solvent such as ethanol, for a period of time of the order of 6 to 12 hours, at a temperature af about 50° C. to 100° C., furnishes the corresponding 3β - halo - 16β - (amino) - carbonyl-Δ⁵-17α-pregnen-20-one derivatives (III), which upon reaction in an alkaline medium, such as a solution of an alkali metal hydroxide in methanol, produce the corresponding Δ⁵-17β-pregnene derivatives (IV).

The following specific examples serve to illustrate but are not intended to limit the scope of the present invention:

*Example 1*

A solution of 5 g. of 16β-carbomethoxy-Δ⁵-17α-pregnen-3β-ol-20-one in 25 cc. of pyridine was treated with 2.5 g. of tosyl chloride and kept at room temperature for 24 hours, it was then diluted with water and the precipitate separated by filtration, thus giving the 3-tosylate of 16β-carbomethoxy-Δ⁵-17α-pregnen-3β-ol-20-one.

A mixture of 4 g. of the latter product, 6 g. of potassium acetate, 120 cc. of acetone and 100 cc. of water was refluxed for 6 hours. Then it was diluted with water and

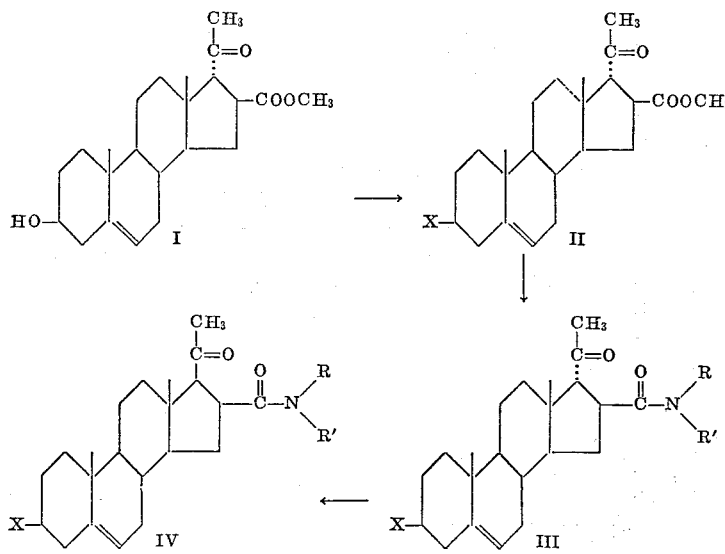

extracted with ethyl acetate. The organic extract was washed with water, dried over anhydrous sodium sulfate and evaporated to dryness. The residue was recrystallized from methylene chloride-methanol, to give 16β-carbomethoxy-3,5-cyclo-17α-pregnen-6β-ol-20-one.

In a polyethylene flask, adapted with magnetic stirrer, there was dissolved 2.8 g. of 16β-carbomethoxy-3,5-cyclo-17α-pregnen-6β-ol-20-one in 30 cc. of methylene chloride, the solution was cooled to 0° C. and a solution of 12 g. of anhydrous hydrogen fluoride in 20 cc. of tetrahydrofurane cooled in a Dry-Ice acetone bath (−70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby there crystallized 3β-fluoro-16β-carbomethoxy-Δ⁵-17α-pregnen-20-one.

Example II

To a solution of 5 g. of 16β-carbomethoxy-Δ⁵-17α-pregnen-3β-ol-20-one in 100 cc. of benzene, were added 5 g. of phosphorus pentachloride and the resulting mixture was refluxed for 1 hour in the absence of moisture. It was then cooled, poured into water; the benzene layer was washed with water several times, dried over anhydrous sodium sulfate and evaporated to dryness. Crystallization of the residue from acetone-hexane yielded; 3β-chloro-16β-carbomethoxy-Δ⁵-17α-pregnen-20-one.

Example III

16β-carbomethoxy-Δ⁵-17α-pregnen-3β-ol-20-one was treated in accordance with Example II, except that phosphorus pentachloride was substituted by phosphorus pentabromide thus affording 3β-bromo-16β-carbomethoxy-Δ⁵-17α-pregnen-20-one.

Example IV 2 g. of 3β-fluoro-16β-carbomethoxy-Δ⁵-17α-pregnen-20-one, and 100 cc. of a saturated solution of ammonium in ethanol were introduced into a tube, which was thereafter sealed and heated to 100° C. This temperature was maintained for 6 hours. The tube was then opened, and the resulting mixture was evaporated to dryness, under reduced pressure. The residue was recrystallized from acetone, thus yielding 3β-fluoro-16β-carbamyl-Δ⁵-17α-pregnen-20-one.

Example V 2 g. of 3β-fluoro-16β-carbomethoxy-Δ⁵-17α-pregnen-20-one, and a solution of 4 g. of dimethylamine in 100 cc. of ethanol were introduced into a tube, which was thereafter sealed and heated to 100° C. This temperature was maintained for 12 hours. The tube was then opened, and the resulting mixture was evaporated to dryness, under reduced pressure. The residue was recrystallized from acetone-hexane, thus yielding 3β-fluoro-16β-(dimethyl carbamyl)-Δ⁵-17α-pregnen-20-one.

Example VI

3β-fluoro-16β-carbomethoxy-Δ⁵-17α-pregnen-20-one was treated in accordance with Example V, except that dimethyl amine was substituted by piperidine, thus affording 3β-fluoro-16β-(piperidino-carbonyl)-Δ⁵-17α-pregnen-20-one.

Example VII

3β-fluoro-16β-carbomethoxy-Δ⁵-17α-pregnen-20-one was treated following the technique described in Example V, except that dimethylamine was substituted by morpholine thus furnishing 3β-fluoro-16β-(morpholino-carbonyl)-Δ⁵-17α-pregnen-20-one.

Example VIII

3β-fluoro-16β-carbomethoxy-Δ⁵-17α-pregnen-20-one was treated in accordance with Example V, but using N-methyl aniline instead of dimethylamine, thus giving 3β-fluoro-16β-(N-methyl-N-phenyl carbamyl)-Δ⁵-17α-pregnen-20-one.

Example IX

3β-fluoro-16β-carbomethoxy-Δ⁵-17α-pregnen-20-one was treated by the procedure of Example V, except that dimethylamine was substituted by N,N-diethylamino ethylamine, thus furnishing 3β-fluoro-16β-(N',N'-diethylaminoethyl-carbamyl)-Δ⁵-17α-pregnen-20-one.

Example X

3β-chloro-16β-carbomethoxy-Δ⁵-17α-pregnen-20-one and 3β-bromo-16β-carbomethoxy-Δ⁵-17α-pregnen-20-one were treated in accordance with Example IV, thus yielding respectively: 3β-chloro-16β-carbamyl-Δ⁵-17α-pregnen-20-one and 3β-bromo-16β-carbamyl-Δ⁵-17α-pregnen-20-one.

Example XI

3β-chloro-16β-carbomethoxy-Δ⁵-17α-pregnen-20-one and 3β-bromo-16β-carbomethoxy-Δ⁵-17α-pregnen-20-one were treated according to Example V, giving respectively: 3β-chloro-16β-(dimethyl carbamyl)-Δ⁵-17α-pregnen-20-one and 3β-bromo-16β-(dimethyl carbamyl)-Δ⁵-17α-pregnen-20-one.

Example XII

3β-chloro-16β-carbomethoxy-Δ⁵-17α-pregnen-20-one and 3β-bromo-16β-carbomethoxy-Δ⁵-17α-pregnen-20-one were treated following the procedure described in Example VI, thus respectively producing 3β-chloro-16β-(piperidino-carbonyl)-Δ⁵-17α-pregnen-20-one and 3β-bromo-16β-(piperidino carbonyl)-Δ⁵-17α-pregnen-20-one.

Example XIII

3β-chloro-16β-carbomethoxy-Δ⁵-17α-pregnen-20-one and 3β-bromo-16β-carbomethoxy-Δ⁵-17α-pregnen-20-one were treated in accordance with Example VII, yielding respectively: 3β-chloro-16β-(morpholino-carbamyl)-Δ⁵-17α-pregnen-20-one and 3β-bromo-16β-(morpholino-carbonyl)-Δ⁵-17α-pregnen-20-one.

Example XIV

The starting compounds of Example XIII were treated in accordance with Example VIII, thus furnishing respectively: 3β-chloro-16β-(N-methyl-N-phenyl carbomyl)-Δ⁵-17α-pregnen-20-one and 3β-bromo-16β-(N-methyl-N-phenyl carbamyl)-Δ⁵-17α-pregnen-20-one.

Example XV

The starting compounds of Example XIII were treated following the technique of Example IX, thus producing respectively: 3β-chloro-16β-(N',N'-diethylamino ethyl carbamyl)-Δ⁵-17α-pregnen-20-one and 3β-bromo-16β-(N',N'-diethylamino ethyl carbamyl)-Δ⁵-17α-pregnen-20-one.

Example XVI

To a solution of 100 mg. of 3β-fluoro-16β-carbamyl-Δ⁵-17α-pregnen-20-one in 15 cc. of methanol, there were added 3 drops of a 2% methanol solution of sodium hydroxide and the mixture kept at room temperature for 48 hours. It was then diluted with water, extracted with ethyl acetate and the organic extract washed to neutral, dried and evaporated to dryness. The residue was recrystallized from acetone-hexane, to give 3β-fluoro-16β-carbamyl-Δ⁵-pregnen-20-one.

The starting compounds under I were treated by the same procedure, thus affording the corresponding products under II.

| I | II |
|---|---|
| 3β-fluoro-16β-(dimethyl carbamyl)-Δ⁵-17α-pregnen-20-one. | 3β-fluoro-16β-(dimethyl carbamyl)-Δ⁵-pregnen-20-one. |
| 3β-chloro-16β-(dimethyl carbamyl)-Δ⁵-17α-pregnen-20-one. | 3β-chloro-16β-(dimethyl carbamyl)-Δ⁵-pregnen-20-one. |
| 3β-bromo-16β-(dimethyl carbamyl)-Δ⁵-17α-pregnen-20-one. | 3β-bromo-16β-(dimethyl carbamyl)-Δ⁵-pregnen-20-one. |
| 3β-fluoro-16β-(piperidino-carbonyl)-Δ⁵-17α-pregnen-20-one. | 3β-fluoro-16β-(piperidino-carbonyl)-Δ⁵-pregnen-20-one. |
| 3β-chloro-16β-(piperidino carbonyl)-Δ⁵-17α-pregnen-20-one. | 3β-chloro-16β-(piperidino carbonyl)-Δ⁵-pregnen-20-one. |
| 3β-bromo-16β-(piperidino-carbonyl)-Δ⁵-17α-pregnen-20-one. | 3β-bromo-16β-piperidino-carbonyl)-Δ⁵-pregnen-20-one. |
| 3β-fluoro-16β-(morpholino carbonyl)-Δ⁵-17α-pregnen-20-one. | 3β-fluoro-16β-(morpholino carbonyl)-Δ⁵-pregnen-20-one. |
| 3β-chloro-16β-(morpholino carbonyl)-Δ⁵-17α-pregnen-20-one. | 3β-chloro-16β-(morpholino carbonyl)-Δ⁵-pregnen-20-one. |
| 3β-bromo-16β-(morpholino carbonyl)-Δ⁵-17α-pregnen-20-one. | 3β-bromo-16β-(morpholino-carbonyl)-Δ⁵-pregnen-20-one. |
| 3β-fluoro-16β-(N-methyl-N-phenyl-carbamyl)-Δ⁵-17α-pregnen-20-one. | 3β-fluoro-16β-(N-methyl-N-phenyl-carbamyl)-Δ⁵-pregnen-20-one. |
| 3β-chloro-16β-(N-methyl-N-phenyl-carbamyl)-Δ⁵-17α-pregnen-20-one. | 3β-chloro-16β-(N-methyl-N-phenyl-carbamyl)-Δ⁵-pregnen-20-one. |
| 3β-bromo-16β-(N-methyl-N-phenyl-carbamyl)-Δ⁵-17α-pregnen-20-one. | 3β-bromo-16β-(N-methyl-N-phenyl-carbamyl)-Δ⁵-pregnen-20-one. |
| 3β-fluoro-16β-(N',N'-diethyl-aminoethyl-carbamyl)-Δ⁵-17α-pregnen-20-one. | 3β-fluoro-16β-(N',N'-diethyl-aminoethyl-carbamyl)-Δ⁵-pregnen-20-one. |
| 3β-chloro-16β-(N',N'-diethyl-aminoethyl-carbamyl)-Δ⁵-17α-pregnen-20-one. | 3β-chloro-16β-(N',N'-diethyl-aminoethyl-carbamyl)-Δ⁵-pregnen-20-one. |
| 3β-bromo-16β-(N',N'-diethyl-aminoethyl-carbamyl)-Δ⁵-17α-pregnen-20-one. | 3β-bromo-16β-(N',N'-diethyl-aminoethyl-carbamyl)-Δ⁵-pregnen-20-one. |

I claim:

1. A compound of the following formula:

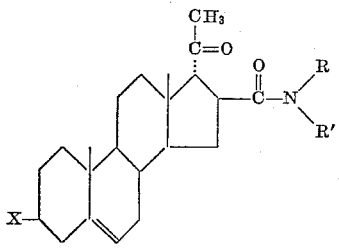

wherein X is selected from the group consisting of fluorine, chlorine and bromine; R and R¹ are selected from the group consisting of hydrogen, a lower alkyl, an amino lower alkyl, a lower alkylamino lower alkyl, a di-lower alkylamino lower alkyl, an aryl containing up to 8 carbon atoms and an aralkyl group containing up to 8 carbon atoms, and R and R¹ together with the nitrogen form a heterocyclic radical selected from the group consisting of piperidino, morpholino, pyrrolidino, and piperazino.

2. 3β-fluoro-16β-carbamyl-Δ⁵-17α-pregnen-20-one.
3. 3β-chloro-16β-carbamyl-Δ⁵-17α-pregnen-20-one.
4. 3β-bromo-16β-carbamyl-Δ⁵-17α-pregnen-20-one.
5. 3β-fluoro-16β-(dimethyl carbamyl)-Δ⁵-17α-pregnen-20-one.
6. 3β-chloro-16β-(dimethyl carbamyl)-Δ⁵-17α-pregnen-20-one.
7. 3β-bromo-16β-(dimethyl carbamyl)-Δ⁵-17α-pregnen-20-one.
8. 3β-fluoro-16β-(piperidino carbonyl)-Δ⁵-17α-pregnen-20-one.
9. 3β-chloro-16β-(piperidino carbonyl)-Δ⁵-17α-pregnen-20-one.
10. 3β-bromo-16β-(piperidino carbonyl)-Δ⁵-17α-pregnen-20-one.
11. A compound of the following formula:

wherein X is selected from the group consisting of fluorine, chlorine and bromine; R and R¹ are selected from the group consisting of hydrogen, a lower alkyl, an amino lower alkyl, a lower alkylamino lower alkyl, a di-lower alkylamino lower alkyl, an aryl containing up to 8 carbon atoms and an aralkyl group containing up to 8 carbon atoms, and R and R¹ together with the nitrogen form a heterocyclic radical selected from the group consisting of piperidino, morpholino, pyrrolidino, and piperazino.

12. 3β-fluoro-16β-carbamyl-Δ⁵-pregnen-20-one.
13. 3β-chloro-16β-carbamyl-Δ⁵-pregnen-20-one.
14. 3β-bromo-16β-carbamyl-Δ⁵-pregnen-20-one.
15. 3β-fluoro-16β-(dimethyl carbamyl)-Δ⁵-pregnen-20-one.
16. 3β-chloro-16β-(dimethyl carbamyl)-Δ⁵-pregnen-20-one.
17. 3β-bromo-16β-(dimethyl carbamyl)-Δ⁵-pregnen-20-one.
18. 3β-fluoro-16β-(piperidino carbonyl)-Δ⁵-pregnen-20-one.
19. 3β-chloro-16β-(piperidino carbonyl)-Δ⁵-pregnen-20-one.
20. 3β-bromo-16β-(piperidino carbonyl)-Δ⁵-pregnen-20-one.

No references cited.